United States Patent [19]
Abthoff et al.

[11] Patent Number: 4,767,740
[45] Date of Patent: Aug. 30, 1988

[54] METALLIC SUPPORT FOR EXHAUST GAS CATALYSTS OF OTTO-ENGINES AND METHOD FOR MAKING THE SUPPORT

[75] Inventors: Joerg Abthoff, Pluederhausen; Hans-Dieter Schuster, Schorndorf; Karlwalter Schmidt, Weinstadt, all of Fed. Rep. of Germany

[73] Assignee: Daimler-Benz Aktiengesellschaft, Stuttgart, Fed. Rep. of Germany

[21] Appl. No.: 69,232

[22] Filed: Jul. 2, 1987

[30] Foreign Application Priority Data

Jul. 2, 1986 [DE] Fed. Rep. of Germany ....... 3622115

[51] Int. Cl.$^4$ ............................................. B01J 32/00
[52] U.S. Cl. .................................... 502/439; 502/527; 423/213.5
[58] Field of Search ............................... 502/439, 527; 423/213.5

[56] References Cited

U.S. PATENT DOCUMENTS 3,036,369  5/1962  Wilkins .............................. 29/157.3
3,944,505  3/1976  La Croix ......................... 502/527 X

FOREIGN PATENT DOCUMENTS 1150696   1/1958  France .
55-132640 10/1980  Japan ................................. 502/527

Primary Examiner—W. J. Shine
Attorney, Agent, or Firm—Barnes & Thornburg

[57] ABSTRACT

Use of a metallic partial composite laminate body which is provided with a large number of axially extending channels and is made by expanding a large number of layers, as support for exhaust gas catalysts of Otto-engines in which the mutually oppositely disposed non-inflated edge portions of the expanded partial composite laminate body serve for a particularly stable fastening of the support in the catalyst housing.

10 Claims, 2 Drawing Sheets

METALLIC SUPPORT FOR EXHAUST GAS CATALYSTS OF OTTO-ENGINES AND METHOD FOR MAKING THE SUPPORT

BACKGROUND AND SUMMARY OF THE INVENTION

The present invention relates to a metallic support for exhaust gas catalysts of Otto-engines.

Catalyst supports of ceramic material as well as of (steel) sheet metal plating are known as supports for the exhaust gas catalysts of Otto-engines. The metallic supports are preferably used in proximity of the engine in order to assure a rapid actuation of the catalyst, i.e., a rapid reaching of the reaction temperature. They consist in general of wound or stacked layers constructed like corrugated paper board. The connection of the layers takes place generally by brazing, however, it is not very stable because the brazing solder must resist the high temperatures in proximity of the engine. Only very few brazing solders are suitable for this purpose. A further difficulty resides in uniformly coating with the catalyst both the parts wetted with the brazing solder as also the non-wetted parts. It is also known to manufacture metal supports in which the layers are not soldered or brazed together with each other. Undular-shaped sheet metal panels are thereby stacked slightly staggered with respect to one another and enclosed externally. However, this solution is unstable, produces more counter-pressure with the same ratio between through-flow cross section and catalyst surface than the brazed supports and wears rapidly by reason of the vibrations occurring in engine operation. A further disadvantage of the prior art metal supports resides in that a permanent connection of the support with the catalyst housing is possible only with very large expenditures.

The object of the present invention resides in providing a metallic catalyst support which can be manufactured in a simple manner, offers a uniform coating surface for the catalyst and therebeyond can be easily and reliably secured in the catalyst housing.

The underlying problems are solved according to the present invention by the use of a partial composite laminate body as support for exhaust gas catalysts of Otto-engines which is provided with a large number of axially extending channels and made by expanding a large number of layers.

Metallic partial composite laminate bodies which can be used as catalyst support and are made by expanding as well as the basic method steps involved in their manufacture are known as such.

A large number of sheet metal layers or laminations, in general 10 to 150 are stacked one above the other for the manufacture of the expanded partial composite laminate body. At least one side of each layer is printed with a paste in a pattern that corresponds to the subsequently expanded areas. The areas in which the layers are to be connected with each other remain free of paste. The paste thus acts as separating agent which prevents the welding of the layers. The sheet metal layers or laminations stacked one above the other and provided with the paste print are now rolled one upon the other. As a result of the very strong plastic deformation during the rolling (50 to 60% cross-sectional reduction), a cold-welding takes place between the areas of the sheet metal panels which are not provided with the paste. Subsequent to the welding, the composite laminate body is heated, the paste disposed between the metal layers evaporates, and the resulting gas pressure expands the non-welded walls. Owing to the welding, the resulting channels possess a uniform surface which is not contaminated with brazing solder. Problems as regards adhesion of the catalyst, respectively, of the wash coat layer on different material surfaces therefore no longer exist, and therebeyond a welded connection is also more mechanically resistant than a brazed connection. The connecting seams of the individual layers are each offset with respect to the next layer. Depending on the degree of offset, the channels may possess in cross section the form starting from flat diamonds over squares to upright diamonds. A material which is corrosion-resistant under the planned use conditions, must be utilized as material for the individual layers; in general, one will come back to steel sheet metal plating. The wall thickness of the channels of the expanded partial composite laminate body can be kept extraordinarily low by reason of the manufacturing method, for example, within the range of 0.01 mm. The handling of such thin sheet metal panels would practically not be possible for the purpose of brazing. The manufacture of the expanded partial composite laminate bodies takes place in such a manner that the body includes two mutually oppositely disposed, axially extending non-expanded edge portions. These non-expanded edge portions can serve with advantage as fastening flange, for the body in the catalyst housing because a very safe fastening and at the same time a very uniform force introduction is possible by way of the same.

BRIEF DESCRIPTION OF THE DRAWINGS

These and other objects, features and advantages of the present invention will become more apparent from the following description when taken in connection with the accompanying drawing which shows, for purposes of illustration only, two embodiments in accordance with the present invention, and wherein.

DETAILED DESCRIPTION OF THE DRAWINGS

Figure 1:
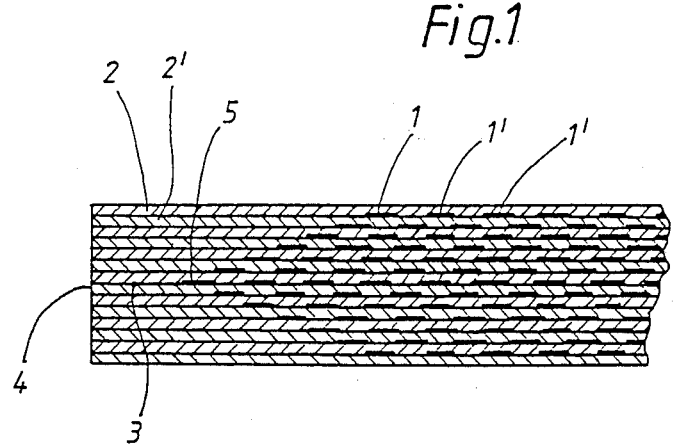
FIG. 1 is a partial schematic cross-sectional view through a not yet expanded blank for a catalyst support in accordance with the present invention, the cross section being taken transversely to the subsequent flow direction.

Referring now to the drawing wherein like reference numerals are used throughout the various views to designate like parts, the blank illustrated FIG. 1 consists of 14 layers 2, 2', etc. of a temperature-stable metal, especially of steel plating. The paste 1, 1', 1'', etc. which serves the subsequent expanding of the body, is located between the individual metal layers 2, which is arranged in a pattern applied corresponding to the subsequently resulting channels. The individual paste layers 1, 1', etc. are arranged mutually offset. Furthermore, the beginning of the paste coating on the individual layers is undertaken stepped from the edge 4 so that the paste coating 5 in the central layer 3 lies closest to the edge 4, and the stepping is so undertaken that the paste application in the outermost layers takes place farthest removed from the edge 4. As the composite laminate body illustrated in FIG. 1 is constructed symmetrically, only the left half is illustrated in this figure. The non-illustrated right edge of the composite laminate body is constructed analogously to the left edge.

Figure 2:
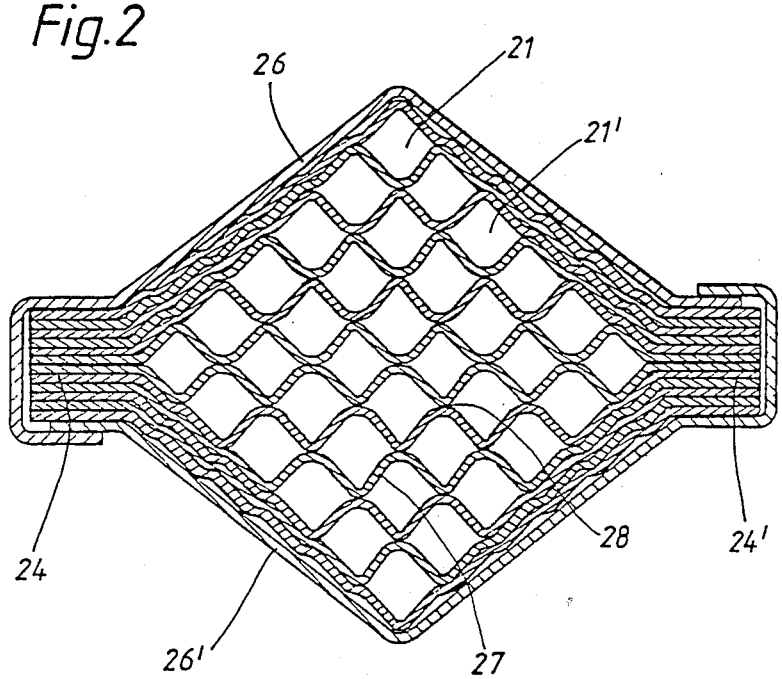
FIG. 2 is a somewhat schematic cross-sectional view through a completely expanded support assembled in a catalyst housing, the cross section also taken transversely to the flow direction of the exhaust gases.

If the composite laminate body illustrated in FIG. 2 is now heated so high that the paste material 1, 1', etc. evaporates, then the body is effectively inflated and thereby expanded; and an expanded composite laminate body will result as is illustrated in FIG. 2. At those places at which the paste 1, 1', etc. existed beforehand, channels 21, 21', etc. have now formed by the resulting gas pressure. As the edges of the body 24 and 24' move toward one another during the expanding, one is able to determine the outer shape of the body as well as that of the cells 21, 21', etc. from flat diamonds by way of squares up to upright diamonds by the extent by which one permits the edges 24 and 24' to move toward one another. With an asymmetrical paste application in contrast to FIG. 1, also a multi-corner, polygon-like outer contour can be produced. If the paste inclusions are not offset accurately by one-half length, then rectangular cells will result and a rectangular outer contour or with an asymmetric beginning of the paste inclusions, an oval outer contour. The completed expanded partial composite laminate body according to FIG. 2 is secured at its edges 24 and 24' in the catalyst housing formed of two shells 26 and 26'. By fastening the catalyst support at the non-expanded edges 24 and 24' in conjunction with the offset beginning of the paste application, a very uniform force introduction into the catalyst support results and therewith an extraordinarily stable and permanent mounting. It is also permanent because thermal expansions of the walls 27 extending diagonally between the clamping-in places 24 and 24' can unfold unimpairedly. They produce no buckling or shortening of the walls but only smallest bending at the cross-over points 28. In addition to the fastening illustrated in FIG. 2, the catalyst housing can, of course, be connected with the support by welding or brazing along the edges 24 and 24'. The individual layers illustrated in FIG. 1 as also in FIG. 2 at the edge 4, respectively, 24 are, of course, no longer recognizable in practice because the individual layers are welded together into a unitary metal block and can be made visible only by metallographic methods.

Figure 3:
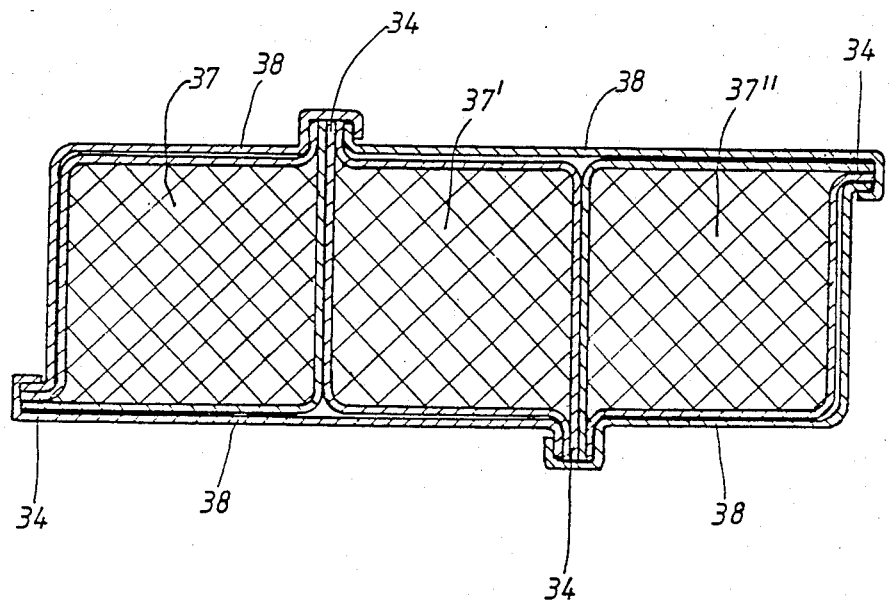
FIG. 3 is a schematic cross-sectional view through a catalyst housing with three expanded partial composite laminate bodies connected with each other and with the housing.

FIG. 3 illustrates in a very schematic manner how, for example, three different catalyst support structures 37, 37', 37'', can be accommodated connected with each other in a catalyst housing 38. The non-expanded ends 34 of the supports are connected with the catalyst housing 38 by rolling-in or flanging whereby the inwardly disposed catalyst supports are once more additionally connected with their adjoining catalyst supports along the non-expanded ends. An extraordinarily rigid connection results therefrom.

Compared to the heretofore known metallic catalyst supports which had to be brazed into the catalyst housing, the advantage is obtained with the instant support according to this invention of a more simple and nonetheless far-reachingly more stable mounting in the catalyst housing. By varying the number of the metal layers (up to 150) and of the distance of the paste application, the number and size of the channels resulting in the support can be varied very simply within wide limits and can be matched to all specific requirements. Thus, it is also possible without difficulties to manufacture supports in which the diameter of the channels varies inside of the support and thus can be matched optimally to certain flow and temperature profiles. One obtains as further advantage that a considerably smaller exhaust gas counter-pressure is produced in the exhaust system by the very thin cell walls of the catalyst support with equal surface available for the application of the catalyst, than with the known prior art metal catalysts. The thinner cell walls, as used in this invention, effect also a lower mass of the support so that the support and therewith also the catalyst reach more rapidly their operating temperature.

While we have shown and described only two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A support structure for exhaust gas catalysts produced by the process comprising:
    applying a separating agent in a pattern on a plurality of metallic members such that given areas are devoid of separating agent;
    stacking said plurality of metallic members;
    welding together said plurality of stacked metallic members in areas devoid of said separating agent by applying pressure thereto thereby forming a partial composite body; and
    forming channels in said partial composite body in said areas including separating agent applied thereto by inflating said welded together stacked metallic members.

2. A support structure as in claim 1, wherein said applying of said pattern includes applying individual spaced apart strips of separating agent on a plurality of said metallic members, said stacking of said metallic members including stacking adjacent members such that the strips of each adjacent member are offset with respect to one another.

3. A support structure as in claim 2, including a middle metallic member with opposite outer edges perpendicular to a first and second side and a plurality of metallic members each having opposite outer edges stacked on either side of said middle metallic member, wherein said applying of separating agent and said stacking of metallic members includes stacking said metallic members in a layered pattern such that said middle metallic member includes a plurality of evenly spaced separating agent strips including an outer strip toward each outside edge spaced a first distance from each outside edge, each of said plurality of stacked members on either side of said middle metallic member including a plurality of evenly spaced separating agent strips including an outer strip spaced a given distance from each outer edge, said given distance increasing from said first distance as each layer of metallic members increases in distance from said middle metallic member.

4. A support structure for exhaust gas catalysts, comprising:
    an inflated partial composite laminate body, said inflated partial composite laminate body including a plurality of partially welded together stacked layers of a specific metallic material, said welded together metallic layers including a plurality of welded together portions welding together adjacently stacked metallic layers, said welded together portions being spaced in between a plurality of axially extending inflated channels in between inflated adjacently stacked metallic layers, said plurality of welded together portions including only said specific metallic material.

5. A method of making a support structure for exhaust gas catalysts, comprising:
applying a separating agent in a pattern on a plurality of metallic members such that given areas are devoid of separating agent;
stacking said plurality of metallic members;
welding together said plurality of stacked metallic members in areas devoid of said separating agent by applying pressure thereto thereby forming a partial composite body; and
forming channels in said partial composite body in said areas including separating agent applied thereto by inflating said welded together stacked metallic members.

6. A method as in claim 5, wherein said applying of said pattern includes applying individual spaced apart strips of separating agent on a plurality of said metallic members, said stacking of said metallic members including stacking adjacent members such that the strips of each adjacent member are offset with respect to one another.

7. A method as in claim 6, including a middle metallic member with opposite outer edges perpendicular to a first and second side and a plurality of metallic members each having opposite outer edges stacked on either side of said middle metallic member, wherein said applying of separating agent and said stacking of metallic members includes stacking said metallic members in a layered pattern such that said middle metallic member includes a plurality of evenly spaced separating agent strips including an outer strip toward each outside edge spaced a first distance from each outside edge, each of said plurality of stacked members on either side of said middle metallic member including a plurality of evenly spaced separating agent strips including an outer strip spaced a given distance from each outer edge, said given distance increasing from said first distance as each layer of metallic members increases in distance from said middle metallic member.

8. A method as in claim 5, wherein said welding together by applying pressure includes rolling a device with pressure on said plurality of stacked metallic members.

9. A method as in claim 8, wherein said forming of channels by inflation includes heating said partial composite body such that said applied separating agent evaporates forming a gas pressure which inflates said areas previously having separating agent applied thereto.

10. A method as in claim 5, wherein said forming of channels by inflation includes heating said partial composite body such that said applied separating agent evaporates forming a gas pressure which inflates said areas previously having separating agent applied thereto.

* * * * *